Patented Nov. 26, 1940

2,223,168

UNITED STATES PATENT OFFICE 2,223,168

PROCESS OF REMOVING SPRAY RESIDUES

Bernard A. Dombrow, New York, N. Y., and Louis T. Rosenberg, Ridgefield Park, N. J., assignors to National Oil Products Company, Harrison, N. J., a corporation of New Jersey No Drawing. Application April 5, 1938, Serial No. 200,138

10 Claims. (Cl. 99—103)

The invention relates, in general, to the washing of fruits and vegetables and, in particular, to a process of removing spray residues from fruits and vegetables and to correlated improvements in compositions for carrying out such processes.

It is customary in combating insects and other pests, which are detrimental to plant life, to employ insecticidal sprays containing toxic compounds, such as lead arsenate, calcium arsenate, lime-sulfur, Bordeau mixture, etc. In many cases these insecticidal sprays also have included therein oils and other substances, such as casein or the like to ensure adherence of the toxic constituent to the sprayed surface and to inhibit the washing action of the rains or other moisture.

In accordance with the regulations promulgated by the health authorities, the toxic spray residues remaining on sprayed fruits and vegetables must be removed therefrom before marketing the produce. The use of dilute mineral acid solutions have been used extensively with varying degrees of satisfaction. However, within the recent years, the authorities have decreased the tolerable amount of toxic substances permissible which has, in turn, required the farmers to seek new, improved and more efficient methods of washing their fruits and vegetables. Moreover, the increased use of oils and other adherence promoting substances in the sprays has further increased the difficulty of removing the spray residues. The natural waxes formed on the surface of some fruits and vegetables, as well as the aforementioned adherence promoting agents, serve to coat and envelope the particles of the toxic agent employed, thus protecting the toxic agent from the dissolving action of the mineral or other acid employed during the washing process.

In an attempt to increase the efficiency of acid washing solutions, various organic substances possessing wetting or detergent properties have been proposed and used with some success. However, great difficulty has been encountered in view of the unstability of the heretofore proposed organic substances in the presence of mineral acids of the concentration normally used in washing fruits and vegetables. Moreover, these wetting agents or detergents have, in many instances, displayed burning effects on the fruits and vegetables thus treated, rendering them unmarketable.

The general object of the invention is to obviate the foregoing and other disadvantages.

Another object of the invention is to provide an improved method of removing spray residues from fruits and vegetables.

A specific object of the invention is to provide an improved acidic solution for removing spray residues from fruits and vegetables which is characterized by being stable and highly efficient.

A further object of the invention is to provide an efficient process of removing spray residues from fruits and vegetables without burning or otherwise deleteriously affecting the produce being treated.

Other objects will in part be obvious and will in part appear hereinafter.

According to the invention there is provided a process for removing spray residues from fruits and vegetables which comprises applying thereto a dilute aqueous solution of an acid containing a small proportion of a sulfonated fatty material or derivative thereof having an $SO_3$ content of more than 10%. The invention further provides a composition for removing spray residues from fruits and vegetables comprising a dilute aqueous solution of an acid and a small amount of a sulfonated fatty material or derivative thereof having an $SO_3$ content of more than 10%.

The invention accordingly comprises the several steps and relation of one or more of such steps with respect to each of the others, and a composition of matter possessing the characteristics, properties and relation of components, all of which will be exemplified in the following detailed disclosure, and the scope of the invention will be indicated in the claims.

It has now been discovered that the penetrating action of aqueous acidic solutions, which serve to dissolve the lead arsenate or other toxic substance present in spray residues, may be greatly enhanced by incorporating therein a sulfonated material having an $SO_3$ content of more than 10%. The materials found suitable for this purpose include sulfonated fatty oils or waxes, such, for example, as sulfonated castor oil, corn oil, fish oils, sperm oil, neat's-foot oil, linseed oil, lard oil, rapeseed oil, soya bean oil, cottonseed oil, teaseed oil, etc.; and synthetic esters formed by reacting highly sulfonated fatty acids with alcohols such as ethyl alcohol, butyl alcohol, glycerine or glycol, e. g. glycol mono or dioleate, ethyl oleate, butyl ricinoleate, etc., glyceryl mono or dioleate, stearate, palmitate, etc. The sulfonated products may be neutralized in the usual manner with a suitable alkaline material, such as an alkali metal base, for example, sodium or potassium, hydroxides, carbonates, etc. or nitrogenous bases, such as ammonia, urea, alkylolamines, primary, secondary or tertiary amines, etc.

Products of the above type produced by the ordinary sulfonation processes contain about 4% to 10% SO₃. Such products are not stable to dilute acid solutions and cannot, therefore, be successfully used therein. On the other hand, sulfonated products of the aforementioned type containing more than 10% SO₃ remain stable in a dilute aqueous solution of hydrogen chloride. Sulfonated products having a high SO₃ content may be produced according to the processes disclosed in copending U. S. patent applications, Serial Nos. 128,600 and 189,892, filed March 2, 1937 and February 10, 1938, respectively. Broadly, these applications disclose the production of sulfonated fatty materials of high SO₃ content by extracting sulfonated materials with organic solvents to separate the highly sulfonated portions from the low or unsulfonated fractions.

Sulfonated fatty materials having an SO₃ of more than 10%, whether produced according to the processes of the aforementioned applications or by other suitable processes, are admirably suited for the purposes of this invention. While a product containing more than 10% SO₃ may be used, it is preferred to employ products containing 15% or more organically combined SO₃. It has been found that the stability of a sulfonated product in the presence of an acid medium increases proportionally with the SO₃ content thereof. Hence a product containing up to about 15% SO₃ will remain stable in 1% HCl; a product containing about 15% or more SO₃ is necessary to ensure stability in a 2% solution of HCl. Moreover, the specific fatty material employed also introduces a variable factor as certain sulfonated products are more stable than others, notwithstanding their equivalent SO₃ content. For example, sulfonated mono and diglycerides of higher fatty acids exhibit an increased stability with respect to certain sulfonated triglycerides containing the same SO₃ content.

The process and composition of the invention are adapted for the treatment of any suitable form of vegetation from which it is desired to remove spray and like residues. To illustrate but a few of the types of produce which may be treated according to the invention, the following fruits and vegetables may be suggested: apples, pears, plums, peaches, prunes, cherries, grapes, lemons, oranges, grapefruit, beans, celery, peas, spinach, chard and the like.

Any suitable acid, preferably water-miscible, may be employed, such as hydrochloric, nitric, sulfuric, acetic or any other suitable acid or mixture thereof, which is characterized by the property of dissolving lead arsenate or other known toxic agents employed in insecticidal sprays. Hydrochloric acid has proved to be desirable from many aspects and hence an aqueous solution of this acid is highly preferred. The concentration of the acid solution may be varied within relatively wide limits, 0.5% to 3.0%, but a range of about 1% to 2% is preferred.

The temperature at which the washing may be carried out will vary according to the particular fruit or vegetable under treatment, as well as according to the particular composition being employed. A temperature range of 70° to 100° F. has been found preferable. The amount of high SO₃ material may be varied between 0.5 to 3.0%, the range of 1% to 2% being preferred when used with a 1% to 2% aqueous solution of hydrochloric acid.

For a fuller understanding of the nature and objects of the invention, reference should be had to the following examples which are given merely to illustrate further the invention and are not to be construed in a limiting sense:

*Example I*

To a 1.5% aqueous hydrochloric acid solution there is added 1.5% of the monoglycol ester of sulfonated oleic acid which may be prepared by forming the sodium soap of sulfonated oleic acid having an SO₃ content of 15.9% prepared in accordance with the process of the aforementioned United States patent application Serial No. 128,600 and reacting this soap in substantially dry form with ethylene chlorohydrin until the total alkali is about 2%. Apples originally containing .024 grains of lead per pound showed a lead content of .008 grains per pound after washing with this solution.

*Example II*

An aqueous solution containing 1.75% hydrochloric acid and 1.75% of sulfonated monoglyceryl oleate having an SO₃ content of 14% was used in washing a batch of apples bearing a spray residue. The results were comparable to those given in Example I.

The mechanical method of washing the fruit and vegetables may be carried out in any suitable known equipment or by hand. The time of washing should be determined according to the fruit or vegetable being treated and by the temperature and concentration of the solution being employed. Fruits and vegetables treated according to the invention have exhibited an enhanced appearance and have displayed no deleterious after effects upon storage for large periods of time. Moreover, the surplus waxy coating prevalent on some fruits and vegetables, as well as the oil and/or other adherence promoting agent in the spray residue, are also removed during the washing process. After the produce has been subjected to washing with the acidic solution, it should be rinsed one or more times with plain water. The expression "fatty residue" is employed in the claims to connote the fatty acid radicle or portion of the fatty derivatives involved, including the fatty acid esters and the like.

It is obvious that other suitable agents may be added to the composition of the invention, such, for example, as defoaming agents, additional wetting and/or emulsifying agents, soaps, etc.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which, as a matter of language, might be said to fall therebetween; and that they are intended to be inclusive in scope and not exclusive, in that if desired, other materials may be added to our novel composition of matter herein claimed without departing from the spirit of the invention. Particularly it is to be understood that in said claims, ingredients or components recited in the singular, are intended to include compatible mixtures of said ingredients wherever the sense permits.

Having described our invention, what we claim as new and desire to secure by Letters Patent is:

1. A process for removing spray residues from fruits and vegetables which comprises applying thereto a dilute aqueous solution of an inorganic acid containing a small proportion of a sulfonated glycol ester of a fatty acid having an $SO_3$ content of more than 10% based on the weight of the fatty residue.

2. A process for removing spray residues from fruits and vegetables which comprises applying thereto a dilute aqueous solution of an inorganic acid containing a small proportion of a sulfonated glyceryl ester of a fatty acid having an $SO_3$ content of more than 10% based on the weight of the fatty residue.

3. A process for removing spray residues from fruits and vegetables which comprises applying thereto a dilute aqueous solution of an inorganic acid containing a small proportion of a sulfonated glycol ester of oleic acid having an $SO_3$ content of more than 15% based on the weight of the fatty residue.

4. An improved washing solution for fruits and vegetables comprising a dilute aqueous solution of an inorganic acid containing a small proportion of a glycol ester of a sulfonated fatty acid having an $SO_3$ content of more than 10% based on the weight of the fatty residue.

5. An improved washing solution for fruits and vegetables comprising a dilute aqueous solution of an inorganic acid containing a small proportion of a sulfonated glyceryl ester of a fatty acid having an $SO_3$ content of more than 10% based on the weight of the fatty residue.

6. An improved washing solution for fruits and vegetables comprising a dilute aqueous solution of an inorganic acid containing a small proportion of a glycol ester of sulfonated oleic acid having an $SO_3$ content of more than 15%.

7. A process for removing spray residues from fruits and vegetables, which comprises applying thereto a dilute aqueous solution of an inorganic acid containing a small proportion of a sulfonated higher fatty acid ester having an $SO_3$ content of more than about 10% based on the weight of the fatty residue.

8. A process for removing spray residues from fruits and vegetables, which comprises applying thereto a dilute aqueous solution of an inorganic acid containing a small proportion of a sulfonated higher fatty acid ester having an $SO_3$ content of more than about 15% based on the weight of the fatty residue.

9. An improved washing solution for fruits and vegetables comprising a dilute aqueous solution of an inorganic acid containing a small proportion of a sulfonated higher fatty acid ester having an $SO_3$ content of more than about 10% based on the weight of the fatty residue.

10. An improved washing solution for fruits and vegetables comprising a dilute aqueous solution of an inorganic acid containing a small proportion of a sulfonated higher fatty acid ester having an $SO_3$ content of more than about 15% based on the weight of the fatty residue.

BERNARD A. DOMBROW.
LOUIS T. ROSENBERG.